United States Patent [19]

Plumb et al.

[11] 4,093,871
[45] June 6, 1978

[54] CORRECTION CIRCUIT

[75] Inventors: George Arthur Plumb, Lower Withington; John Leo Thomas Bushell, Cheadle Hulme; Patrick Louis Radford, Stockport, all of England

[73] Assignee: P.C. Compteurs Limited, Cheadle Hulme, England

[21] Appl. No.: 730,033

[22] Filed: Oct. 6, 1976

[30] Foreign Application Priority Data

Oct. 8, 1975 United Kingdom .............. 41130/75

[51] Int. Cl.² .......................... H02K 3/00; H02K 3/64
[52] U.S. Cl. .................................. 307/106; 73/194 E; 73/194 M; 324/75
[58] Field of Search .............. 307/106, 271; 73/194 E, 73/194 M, 231 R, 233; 235/151.34; 324/74, 75

[56] References Cited

U.S. PATENT DOCUMENTS

| | | | |
|---|---|---|---|
| 3,610,898 | 10/1971 | Yamamoto et al. | 73/194 M |
| 3,614,892 | 10/1971 | Ottenstein | 73/233 |
| 3,688,573 | 9/1972 | Garrett | 73/233 |
| 3,691,838 | 9/1972 | Kalotay | 235/151.34 |
| 3,745,827 | 7/1973 | Swanson | 73/233 |
| 3,823,310 | 7/1974 | Kalotay et al. | 235/151.34 |
| 3,905,229 | 9/1975 | Togo et al. | 73/194 E |
| 3,978,727 | 9/1976 | Griverus | 73/194 E |
| 4,005,603 | 2/1977 | Golahny et al. | 73/194 M |

*Primary Examiner*—Robert K. Schaefer
*Assistant Examiner*—Eugene S. Indyk
*Attorney, Agent, or Firm*—William R. Sherman; Kevin McMahon; Edward Manzo

[57] ABSTRACT

A correction circuit for correcting the frequency of the output pulses produced by a gas flowmeter in dependence on the temperature of the gas comprises a control input for receiving a voltage representative of the difference between the temperature of the gas and a reference temperature. A voltage-controlled oscillator, operative during fixed short periods initiated by each flowmeter pulse, produces auxiliary pulses at a rate dependent on the voltage at the control input, and the auxiliary pulses are counted in a counter. Each time the counter counts a predetermined number of auxiliary pulses, it produces a signal which either blocks one flowmeter pulse or adds an additional pulse to the flowmeter pulses, in dependence on the polarity of the temperature difference.

The correction circuit also includes a power supply which continuously energizes only a first portion of the circuit, such first portion consuming a relatively small proportion of the power requirements of the circuit, and switching means connected to the power supply and responsive to flowmeter output pulses to energize the remainder of the circuit for a relatively short period, thereby to reduce the total power requirements of the circuit.

Also disclosed is a test circuit to cooperate with such a correction circuit including an oscillator for producing test pulses of predetermined frequency, a switch for applying the test pulses to the correction circuit instead of pulses produced by the flowmeter output, and a counter arranged to count the number of pulses between either two successive adding operations or two successive blocking operations.

8 Claims, 2 Drawing Figures

FIG. 2

CORRECTION CIRCUIT

BACKGROUND OF THE INVENTION

This invention relates to correction circuits for correcting the output signals produced by fluid flowmeters of the type which can be arranged to produce an electrical pulse output signal whose pulse repetition rate is representative of the volumetric flow rate of the fluid whose flow rate is being measured by the flowmeter, the correction being effected in dependence upon at least one other parameter of the fluid, for example its temperature and/or pressure. Flowmeters of this type will hereinafter be referred to as flowmeters of the type defined, and a typical example is a turbine flowmeter. The invention is more particularly, but not exclusively, concerned with such correction circuits for correcting the output signals produced by gas flowmeters of the type defined, in dependence upon the temperature of the gas.

When measuring the total volume of gas flowing through a pipe by means of a gas flowmeter of the type defined, it is often necessary to correct the volume measurement in dependence upon the temperature and pressure of the gas, although under certain circumstances a temperature correction alone is sufficient. For this temperature correction, the volume measurement is corrected so as to determine the volume the gas would have occupied had it been constantly at a reference temperature, which is typically 60° F (15.5° C) for the United Kingdom.

In turbine or like flowmeters which are arranged to drive a mechanical total volume counter via a gear train, it is known to effect the temperature correction by including in the gear train an infinitely variable transmission whose transmission ratio varies in dependence upon the temperature of the gas. However, such a mechanical arrangement is relatively complex and consequently tends to be unreliable. Additionally, it is both difficult and expensive to retro-fit an existing flowmeter, not having a temperature correction facility, with a temperature-responsive variable ratio transmission. It is therefore an object of the present invention in one of its aspects to provide an electrical correction circuit for correcting the output signal of a flowmeter of the type defined in dependence upon a parameter, for example the temperature, of the fluid passing through the flowmeter.

When a gas flowmeter of the type defined is used to measure the total volume of gas flowing through a pipe, as outlined above, it is frequently located in a place at which a mains electricity supply is not readily available. It is therefore an object the invention in another of its aspects to provide such a correction circuit having a relatively low power consumption, thus rendering it suitable for operation for long periods with its power supply provided by primary cells.

SUMMARY OF THE INVENTION

According to one aspect of the present invention, there is provided a correction circuit for correcting the output signal produced by a fluid flowmeter of the type defined in dependence upon at least one parameter of the fluid whose flow rate is being measured by the flowmeter, the circuit comprising a first input for receiving the output signal produced by the flowmeter, a second input for receiving an input signal representative of the magnitude of said parameter, first circuit means responsive to the flowmeter output signal at the first input to generate a first pulse train whose average pulse repetition rate is dependent upon the pulse repetition rate of the flowmeter output signal, second circuit means responsive to the input signal at the second input to generate a second pulse train whose average pulse repetition rate is dependent on the magnitude of said parameter, and means for combining said first and second pulse trains so as to produce an output pulse train whose average pulse repetition rate is representative of the volumetric flow rate of the fluid corrected for variations in said parameter.

According to another aspect of the present invention, there is provided a correction circuit for correcting the output signal produced by a fluid flowmeter of the type defined in dependence upon at least one parameter of the fluid whose flow rate is being measured by the flowmeter, the circuit comprising a first input for receiving the output signal produced by the flowmeter, a second input for receiving an input signal representative of the magnitude of said parameter, first circuit means responsive to the flowmeter output signal at the first input to generate a first pulse train whose average pulse repetition rate is dependent upon the pulse repetition rate of the flowmeter output signal, a difference circuit responsive to the input signal at the second input to generate an auxiliary signal whose magnitude is dependent upon the difference between the magnitude of said parameter and a reference magnitude of said parameter, and means responsive to one of said pulse repetition rates and to the magnitude of the auxiliary signal to increase the number of pulses in the first pulse train by adding auxiliary pulses thereto at a rate dependent upon the magnitude of said difference when said difference is of one polarity, and to decrease the number of pulses in the first pulse train by blocking a fraction thereof at a rate dependent upon the magnitude of said difference when said difference is of the other polarity, whereby the pulse adding and blocking means produces an output pulse train whose average pulse repetition rate is representative of the volumetric flow rate of the fluid corrected for variations in said parameter.

In a preferred embodiment of this latter aspect of the invention, the pulse adding and blocking means comprises second circuit means arranged to produce a second pulse train whose pulses are inter-leaved between the pulses of the first pulse train, gating means connected to receive the first and second pulse trains, and control means responsive to said one of said pulse repetition rates and to the magnitude of the auxiliary signal to control the gating means so as to effect said pulse addition and blocking, the auxiliary pulses being derived from among the pulses of the second pulse train.

The gating means may conveniently comprise a first, normally enabled, AND-function gate and a second, normally disabled AND-function gate respectively connected to receive the first and second pulse trains, and an OR-function gate connected to receive respective pulses transmitted by the two AND-function gates, the output pulse train appearing, in operation, at the output of the OR-function gate. In this case, the control circuit may comprise a voltage- or current-controlled oscillator responsive to the auxiliary signal to produce a control signal in the form of pulses whose frequency is higher than that of the pulses of the first pulse train and dependent upon the modulus of said difference, a counter arranged to count the pulses of the control signal during intervals which are initiated by the pulses of the first pulse train and which are of fixed duration, the counter being arranged to produce an overflow signal each time it reaches a predetermined full-house count, a polarity determining circuit responsive to the auxiliary signal to produce a polarity signal having a first level indicative of said other polarity of said difference and a second level indicative of said one polarity of said difference, a first enabling circuit responsive to the first level of the polarity signal and the overflow signal to temporarily disable the first AND-function gate so as to block at least one pulse of the first pulse train, and a second enabling circuit responsive to the second level of the polarity signal and the overflow signal to temporarily enable the second AND-function gate so as to transmit at least one pulse of the second pulse train.

Preferably, the output of the oscillator is connected to the input of the counter via an AND-function gate which is connected to be enabled by the pulses of the first pulse train.

Where the fluid is a gas and said parameter is the temperature of the gas, the oscillator is preferably arranged to operate at a frequency F given by $$F \alpha \frac{|V_T|}{V_{REF} - V_T}$$

where $V_T$ is the magnitude of the auxiliary signal and $V_{REF}$ is a reference signal defining the reference magnitude of the temperature.

Conveniently, the circuit includes a testing system comprising an oscillator for producing test pulses of predetermined frequency, switch means for applying the test pulses to the first circuit means in place of the flowmeter output signal, and counter means arranged to count the number of pulses produced by the pulse adding and blocking means during an interval defined between two successive adding operations or between two successive blocking operations of the pulse adding and blocking means. Thus said interval may be defined between two successive overflow signals.

Preferably, said predetermined frequency is higher than the highest anticipated pulse repetition rate of the flowmeter output signal.

Advantageously, the circuit has a power supply which, in operation, is continuously connected to energise a first portion of the circuit, said first portion being arranged to consume a relatively small proportion of the power required by the circuit, and further includes switching means connected to the power supply and responsive to each pulse of the flowmeter output signal to energise the remainder of the circuit for a relatively short period, whereby to reduce the total power required by the circuit.

According to another aspect of the present invention there is provided a correction circuit for correcting the output signal produced by a fluid flowmeter of the type defined in dependence upon at least one parameter of the fluid whose flow rate is being measured by the flowmeter, the circuit comprising a first input for receiving the output signal produced by the flowmeter, a second input for receiving an input signal representative of the magnitude of said parameter, first circuit means responsive to the flowmeter output signal at the first input to generate a first pulse train whose average pulse repetition rate is dependent upon the pulse repetition rate of the flowmeter output signal, means responsive to the input signal at the second input to modify the pulse repetition rate of the first pulse train in dependence upon the magnitude of said parameter so as to produce an output pulse train whose average pulse repetition rate is representative of the volumetric flow rate of the fluid corrected for variations in said parameter, a power supply which, in operation, is continuously connected to energise a first portion of the circuit, said first portion being arranged to consume a relatively small proportion of the power required by the circuit, and switching means connected to the power supply and responsive to each pulse of the flowmeter output signal to energise the remainder of the circuit for a relatively short period, whereby to reduce the total power required by the circuit.

In all three aspects of the invention, the first portion of the circuit preferably includes the first circuit means. In this case, preferably, the first circuit means comprises a delay arranged to delay the flowmeter output pulses for a relatively short period, and first pulse producing means responsive to the leading edge of each delayed flowmeter output pulse to produce a corresponding pulse of relatively short duration, the output pulses produced by said first pulse producing means constituting the first pulse train. The switching means is arranged to energise the remainder of the circuit between the leading edge of each flowmeter pulse and the trailing edge of the corresponding pulse produced by the first pulse producing means.

The first pulse producing means may conveniently comprise a first monostable circuit, and the second circuit means may conveniently comprise a second monostable circuit connected to be triggered by the trailing edge of each delayed flowmeter output pulse.

The invention also comprises a flowmeter output circuit incorporating a correction circuit in accordance with any of the preceding statements of invention, the flowmeter output circuit further comprising a pulse counter, preferably an electronic pulse counter, connected to receive and count the pulses of the output pulse train produced by the correction circuit.

BRIEF DESCRIPTION OF THE DRAWINGS

The invention will now be described, by way of non-limitative example only, with reference to the accompanying drawings, of which.

DESCRIPTION OF A PREFERRED EMBODIMENT

Figure 1:
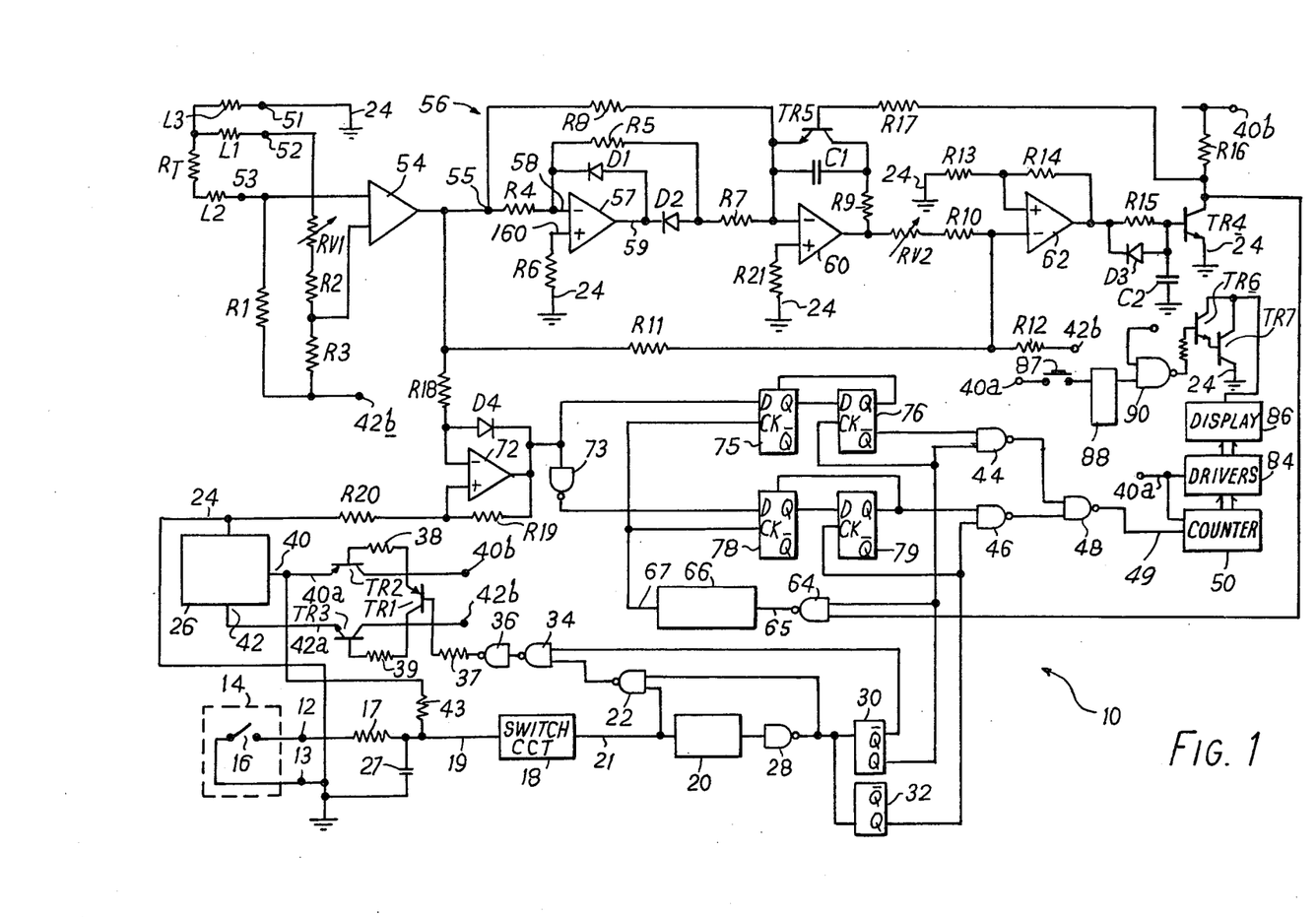
FIG. 1 is a circuit diagram of a temperature correction circuit in accordance with the present invention for correcting the output signal produced by a gas flowmeter of the type defined.

The circuit shown in FIG. 1 is indicated generally at 10, and comprises a first pair of inputs 12, 13 connected to the low frequency transmitter 14 of a gas flowmeter (not shown) of the type defined. The flowmeter may typically be a turbine flowmeter, in which the turbine is arranged to drive an output shaft via step-down gearing at a rotational speed which is proportional to the volumetric flow rate of the gas passing through the flowmeter. The low frequency transmitter 14 comprises a rotary member (not shown) driven by the step-down gearing or the output shaft and having a magnetic insert, and a magnetic reed switch 16 fixedly positioned adjacent the rotary member so as to be periodically closed by the magnetic insert. The frequency of operation of the switch 16 is therefore proportional to the volumetric flow rate of the gas, and is typically in the region of one cycle every few seconds at the maximum flow rate to be measured by the flowmeter. The ratio between the respective durations of successive open and closed states of the switch 16 is arranged to be about 1:1.

The input 12 of the circuit 10 is connected via a resistor 17 to the input 19 of a switching circuit 18, which will be described in more detail hereinafter. The output 21 of the switching circuit 18 is connected to the input of a delay circuit 20 and to one input of a two input NAND gate 22. The input 13 is connected to a zero volt power supply rail 24 of a power supply 26, and, via a capacitor 27, to the input 19 of the switching circuit 18. The delay circuit 20 is a simple RC circuit arranged to produce a delay of about 10 milliseconds, and its output is connected via a logic inverter 28 to the other input of the NAND gate 22 and to one input of each of two monostable circuits 30, 32. The monostable circuit 30 is arranged to be triggered by negative-going voltage transitions, while the monostable circuit 32 is arranged to be triggered by positive-going voltage transitions, and they are both arranged, when triggered, to produce a respective positive going pulse of about 50 milliseconds duration at their respective Q outputs.

The $\overline{Q}$ output of the monostable circuit 30 is connected to one input of a two-input NAND gate 34, whose other input is connected to the output of the NAND gate 22. The output of the NAND gate 34 is connected via a logic inverter 36 and resistor 37 to the base of a PNP transistor TR1, whose emitter is connected via a resistor 38 to the base of a PNP switching transistor TR2 and whose collector is connected via a resistor 39 to the base of an NPN switching transistor TR3. The switching transistor TR2 is connected in series in a positive power supply rail 40 of the power supply 26, so that the part 40a of the rail 40 between the power supply 26 and the emitter of the switching transistor TR2 is continuously energised, while the part 40b of the rail 40 connected to the collector of the switching transistor TR2 is energised only when the switching transistor TR2 is rendered conductive. In an exactly analogous manner, the switching transistor TR3 is connected in series in a negative power supply rail 42 of the power supply 26, thus dividing it into continuously energised and switchably energisable parts 42a and 42b respectively.

A resistor 43 is connected between the continuously energised rail 40a and the input 19 of the switching circuit 18.

The Q output of the monostable circuit 30 is connected to one input of a two-input NAND gate 44, while the Q output of the monstable circuit 32 is connected to one input of a two-input NAND gate 46. The respective outputs of the NAND gates 44, 46 are connected to the inputs of a two-input NAND gate 48, whose output is connected to the count input 49 of six decade BCD counter 50.

The circuit 10 has three further inputs 51, 52, 53, between the latter two of which a resistance thermometer $R_T$ exposed to the gas passing through the flowmeter is connected by means of leads L1, L2. Lead L3 is connected to the zero volt rail 24 via terminal 51. The resistance thermometer $R_T$ and the lead L2 from one arm of a Wheatstone bridge circuit, which comprises three further resistances R1, R2, R3, a variable resistance RV1 and the lead L1. The terminal 53 is connected via the resistance R1 to the switchable negative rail 42b, while the variable resistance RV1 and the resistances R2 and R3 are connected in series between the terminal 52 and the rail 42b. The output terminals of the Wheatstone bridge circuit are constituted by the terminal 53 and the junction between the resistances R2 and R3, and are connected to the inputs of a high input impedance differential amplifier 54. In an initial setting up procedure, the value of the variable resistance RV1 is adjusted to set the voltage at the output of the amplifier 54 to zero when the gas passing through the flowmeter is at a reference temperature $T_{REF}$, typically 60° F.

It will be appreciated that effects due to changes in the respective resistances of the leads L1, L2 tend to cancel out, by virtue of the disposition of these leads in the Wheatstone bridge circuit.

The output of the differential amplifier 54 is connected to the input 55 of a rectifying circuit 56. The circuit 56 comprises a high gain differential amplifier 57, an input resistance R4 connected between the input 55 and the inverting input 58 of the amplifier 57, and a diode D1 negative-feedback connected between the output 59 of the amplifier 57 and its inverting input 58, the anode of the diode D1 being connected to the output 59. A further diode D2 and a resistance R5 are connected in series between the output 59 and the inverting input 58, the cathode of the diode D2 being connected to the output 59. The non-inverting input 160 of the amplifier 57 is connected to the zero volt rail 24 via a resistance R6. The anode of the diode D2 is also connected via a resistance R7 to a current summing point constituted by the inverting input of a differential amplifier 60, while the input 55 of the rectifying circuit 56 is connected to this summing point via a resistance R8. The resistances R4, R5, R8 all have the same value, while the value of the resistance R7 is half that of the resistances R4, R5, R8.

The differential amplifier 60 has a series combination of a resistance R9 and a capacitance C1 connected between its output and its inverting input, thus forming an integrator, while its non-inverting input is connected to the zero volt rail 24 via a resistance R21. The output of the amplifier 60 is connected to the inverting input of a further differential amplifier 62 via a variable resistance RV2 and a resistance R10 in series. The output of the differential amplifier 54 is also connected via a resistance R11, to the inverting input of the amplifier 62, which inverting input is connected to the switchable negative rail 42b via a resistance R12. The non-inverting input of the amplifier 62 is connected to the zero volt rail 24 via a resistance R13, while the output of the amplifier 62 is connected to its non-inverting input via resistance R14. The output of the amplifier 62 is connected via the parallel combination of a resistance R15 and a diode D3 to the base of the NPN transistor TR4, the cathode of the diode D3 being connected to the output of the amplifier 62. A capacitor C2 is connected between the base and the emitter of the transistor TR4. The emitter of the transistor TR4 is connected to the zero volt rail 24, while the collector is connected to the switchable positive rail 40b via a resistance R16. The collector of the transistor TR4 is also connected, via a resistance R17, to the base of an NPN switching transistor TR5 which has its emitter and collector connected in parallel with the capacitance C1.

The collector of the transistor TR4 is further connected to one input of a two-input NAND gate 64, whose other input is connected to the Q output of the monostable circuit 30 and whose output is connected to the count input 65 of a binary counter 66. The counter 66 has an overflow output 67, which is connected to the clock input of each of two D-type bistable circuits 75, 78.

The output of the differential amplifier 54 is also connected via a resistance R18 to the inverting input of yet another differential amplifier 72, whose output is connected to its inverting input via a diode D4 and to its non-inverting input via a resistance R19. The non-inverting input of the amplifier 72 is connected to the zero volt rail 24 via a resistance R20. The output of the amplifier 72 is also connected to the D-input of the bistable circuit 75, and, via a logic inverter 73, to the D-input of the bistable circuit 78.

The Q output of the bistable circuit 75 is connected to the D-input of another D-type bistable circuit 76. The clock input of the bistable circuit 76 is connected to the Q output of the monostable circuit 30, while its Q and $\overline{Q}$ outputs are respectively connected to a reset input of the bistable circuit 75 and to the other input of the NAND gate 44. The Q output of the bistable circuit 78 is connected to the D-input of another D-type bistable circuit 79. The clock input of the bistable circuit 79 is connected to the Q output of the monostable circuit 32, while its Q output is connected to a reset input of the bistable circuit 78 and to the other input of the NAND gate 46.

All of the differential amplifiers, i.e. the analogue portions of the circuit 10, are connected to be energised by the switchable positive and negative power supply rails 40b and 42b, whereas the logic inverters, gates, monostable circuits, bistable circuits, and counters, i.e. the digital or logic portions of the circuit 10, are connected to be energised by the continuously energised positive power supply rail 40a. The terms "logic HI signal" and "logic LO signal" as used herein thus refer to a positive voltage of a few volts and a near zero voltage respectively.

In operation, the bistable circuits 75, 76, 78, 79 are initially in their reset states (logic LO signals at their Q outputs and logic HI signals at their $\overline{Q}$ outputs). The NAND gate 44 is therefore enabled, while the NAND gate 46 is disabled. The monostable circuits 30, 32 are initially in their stable states, and thus both produce logic LO signals at their respective Q outputs, so the NAND gates 44, 46 each produce logic HI signals at their respective outputs and the NAND gate 48 produces a logic LO output signal. Additionally, since in normal operation the switching circuit 18 can be regarded simply as a closed switch, while the reed switch 16 is closed, the switching circuit 18 produces a logic LO output signal, so the NAND gate 22 produces a logic HI output signal and the NAND gate 34 produces a logic LO output signal. The transistor TR1, and therefore the transistors TR2, TR3, are thus held non-conductive, so deenergising the power supply rails 40b and 42b.

It will be assumed initially that the count in the counter 66 is not changing, indicating as will become apparent hereinafter that the temperature of the gas passing through the flowmeter is equal to the reference temperature. Each time the reed switch 16 opens the switching circuit 18 produces a logic HI output signal, thus rendering the transistors TR1, TR2, TR3 conductive via the NAND gates 22, 34 and the inverter 36. The Wheatstone bridge and all the differential amplifiers are thus energised by the power supply rails 40b and 42b.

About 10 milliseconds after the opening of the reed switch 16, the output signal produced by the inverter 28 changes from HI to LO, thus triggering the monostable circuit 30. The monostable circuit 30 therefore produces a 50 millisecond LO output pulse at its $\overline{Q}$ output, which is operative via the NAND gate 34 and inverter 36 to maintain the transistors TR1, TR2, TR3 conductive throughout the 50 milliseconds.

The monostable circuit 30 simultaneously produces a corresponding 50 milllisecond HI output pulse at its Q output, which HI pulse is transmitted with inversion by the already enabled NAND gate 44, transmitted with another inversion by the NAND gate 48, (which is operating as an OR-function gate for LO signals), and is thus counted by the counter 50.

Each time the read switch 16 closes, the monostable circuit 32 is triggered 10 milliseconds later so as to produce a 50 millisecond HI output pulse at its Q output. However, this pulse is blocked by the NAND gate 46, and thus has no effect on the counter 50. Further, the opening of the switch 16 does not effect a temporary energisation of the power supply rails 40b, 42b.

To summarise the foregoing, the reed switch 16 effectively produces at the inputs 12, 13 of the circuit 10 a square wave signal of 1:1 mark-space ratio, whose average frequency is proportional to the volumetric flowrate of the gas passing through the flowmeter. This square wave signal can be regarded as a pulse train composed of positive-going pulses. The leading (i.e. positive-going) edge of each pulse of this pulse train is operative to energise the switchable power supply rails 40b, 42b for 10 milliseconds, and to trigger the monostable circuit 30 after these 10 milliseconds. The monostable circuit 30 produces a 50 millisecond pulse which holds the rails 40b, 42b, energised, so that they are energised for a period of only 60 milliseconds every few seconds. The average frequency of the pulses produced by the monostable circuit 30 is also proportional to the gas flowrate, and when the temperature of the gas is equal to the reference temperature, all of these pulses, and only these pulses, are counted by the counter 50. The count in the counter 50 is thus a measure of the total volume of the gas which has passed through the flowmeter.

When the temperature of the gas is not equal to the reference temperature, the relationship between the measured flowrate of the gas, as defined by the frequency $F_M$ of the flowmeter output pulses, and the temperature corrected frequency $F_C$ of the output pulses to be produced by the circuit 10 is given by $$F_C = F_M \frac{T_{REF}}{T} \qquad (2)$$

where $T$ is the actual temperature (in degrees absolute) of the gas. Equation (2) can be re-arranged as $$F_C = F_M(1 + \frac{T_{REF} - T}{T}) \qquad (3)$$

and it is this equation which the circuit 10 effectively implements.

Thus the voltage appearing between the output terminals of the Wheatstone bridge during each 60 millisecond period for which the bridge, the amplifiers 54, 57, 60, 62, 72 and the transistors TR4, TR5 are energised by the switchable rails 40b, 42b is substantially proportional to the temperature difference $T_{REF} - T$, and this voltage is amplified in the amplifier 54 to produce a voltage $V_T$ also substantially proportional to this temperature difference.

The voltage $V_T$ is applied to the rectifying circuit 56. The operational amplifier defined by the amplifier 57, the resistances R4, R5 and the diodes D1, D2 has a gain of $-R5/R4$ ($= -1$) for positive values of $V_T$, and a gain of zero for negative values of $V_T$ (since the diode D1 becomes conductive), so the current $I_T$ supplied by the circuit 56 to the summing point constituted by the inverting input of the amplifier 60 for positive values of $V_T$ is given by $$I_T = \frac{-V_T}{R7} + \frac{V_T}{R8} = \frac{-V_T}{R8} \text{ (since } R8 = 2 \times R7\text{)} \quad (4)$$

For negative values of $V_T$, the current $I_T$ is given by $$I_T = \frac{-V_T}{R8} \quad (5)$$

Thus the magnitude of the current $I_T$ is independent of the polarity of $V_T$, and is proportional to $|V_T|$.

The current $I_T$ is integrated by the integrator based on the amplifier 60 to produce at the output of the amplifier 60 a positive going-ramp voltage whose slope is proportional to the current $I_T$. This ramp voltage is applied to the inverting input of the amplifier 62 via the resistances RV2 and R10, together with a current proportional to T. This lastmentioned current is derived from the resistances R11 and R12, whose values are selected to ensure they pass currents proportional to $T-T_{REF}$ and $+T_{REF}$ respectively. The amplifier 62 and its associated resistances operate as a level responsive circuit, to render the normally conductive transistor TR4 non-conductive each time the current supplied to the inverting input of the amplifier increases under the influence of the aforementioned ramp voltage to a predetermined level. The non-conductive state of the transistor TR4 renders the transistor TR5 conductive, thereby rapidly discharging the capacitor C1 and restoring the amplifier 62 to its original state. The transistors TR4 and TR5 are thus restored to their conductive and non-conductive states respectively, and the cycle of events described in this paragraph is repeated. The circuitry based around the amplifiers 60, 62 and the transistors TR4, TR5 thus operates as a current-controlled oscillator, which produces at the collector of the transistor TR4 a train of short positive going pulses whose frequency, typically one of more kilohertz, is proportional to $$\frac{|T - T_{REF}|}{T} \quad (6)$$

The pulses appearing at the collector of the transistor TR4 are transmitted via the NAND gate 64 only during the 50 millisecond periods defined by each pulse produced by the monostable circuit 30, and are counted by the counter 66.

The polarity of the voltage $V_T$ is sensed by the differential amplifier 72 and its associated input and feedback components. Thus if $V_T$ is positive, indicating that the actual temperature T of the gas is lower than the reference temperature $T_{REF}$, the amplifier 72 produces a logic LO output signal, while if $V_T$ is negative, indicating that the actual temperature T is higher than the reference temperature $T_{REF}$, the amplifier 72 produces a logic HI output signal.

The count in the counter 66 increases during each of the 50 millisecond periods for which it is permitted to receive the pulses from the collector of the transistor TR4, until it reaches its full house value, typically 512. At this point, the counter 66 produces an overflow pulse at its output 67.

Assuming that the amplifier 72 is producing a logic HI output signal ($T>T_{REF}$), the overflow pulse from the counter 66 sets the bistable circuit 75 by clocking the HI signal at its D input to its Q output, thus applying a logic HI signal to the D input of the bistable circuit 76. The leading edge of the next pulse produced by the monostable circuit 30 immediately sets the bistable circuit 76, also by clocking the logic HI signal at its D input to its Q output, thereby disabling the NAND gate 44 before the pulse from the monostable circuit has been transmitted thereby. This pulse is therefore blocked, and is not counted by the counter 50. The logic HI signal at the Q output of the bistable circuit 76 resets the bistable circuit 75, so that the leading edge of the next pulse from the monostable circuit 30 immediately resets the bistable circuit 76, thereby re-enabling the NAND gate 44 and permitting the pulse to be transmitted to the counter 50 and counted thereby.

If, on the other hand, the amplifier 72 is producing a logic LO output signal ($T<T_{REF}$), the overflow pulse from the counter 66 sets the bistable circuit 78. The leading edge of the next pulse produced by the monostable circuit 32 immediately sets the bistable circuit 79, thereby enabling the NAND gate 46 to transmit this pulse from the monostable circuit 32 to the counter 50, to be counted thereby. This one pulse from the monostable circuit 32 is of course counted in addition to the pulses from the monostable circuit 30, since it is interleaved therebetween. The logic HI signal at the Q output of the bistable circuit 79 resets the bistable circuit 78, so that the leading edge of the next pulse from the monostable circuit 32 immediately resets the bistable circuit 79, thereby disabling the NAND gate 46 before the pulse from the monostable circuit 32 has been transmitted thereby.

After producing an overflow pulse, the counter 66 recommences counting and continues to do so in each of the gated 50 millisecond periods until it produces another overflow pulse, whereupon the appropriate one of the sequences of the two preceding paragraphs is repeated.

Thus the NAND gates 44 and 46 operate under the control of the bistable circuits 75, 76, 78, 79 to proportionally increase the number of pulses counted by the counter 50, by adding pulses from the monostable circuit 32 to those produced by the monostable circuit 30, or to proportionally decrease the number of pulses counted by the counter 50, by blocking a fraction of the pulses produced by the monostable circuit 30, in dependence upon the amount by which the temperature T of the gas passing through the flowmeter lies below or above the reference temperature $T_{REF}$. The count accumulated by the counter 50 represents the total that the gas passing through the flowmeter would have occupied had it been continuously at the reference temperature $T_{REF}$.

The count outputs of the counter 50 are connected via suitable driver amplifiers 84 energised from the rail 40a to a six-digit seven-segment light emitting diode display unit 86. In order to read the count accumulated in the counter 50, a manually operable push button 87 is provided. The push button 87 is connected between the continuously energised positive supply rail 40a and the trigger input of a monostable circuit 88, and pressing the push button 87 causes the monostable circuit 88 to produce a negative-going output pulse of about 10 seconds duration. This pulse is inverted by a NAND gate 90, and renders conductive a Darlington pair of transistors TR6, TR7 connected between the common cathodes of the diodes of the display unit 86 and the zero volt power supply rail 24. The display unit 86 is thus energised for about 10 seconds by the push button 87, and displays the count accumulated in the counter 50.

It will be appreciated that the rails 40b and 42b are energised 10 milliseconds before the NAND gate 64 is enabled in order to permit the Wheatstone bridge and the aforementioned analogue portions of the circuit 10 to stabilise prior to the application of the counter 66 of the pulses produced at the collector of the transistor TR4 in these analogue portions. It will also be appreciated that the power consumed by the analogue portions of the circuit 10 is a high proportion (typically about 95%) of the total power consumed by the circuit, particularly when the digital or logic portions of the circuit 10 are implemented with MOS integrated circuits, so that the power saving achieved by energising the analogue portions for only 60 milliseconds every few seconds is very considerable. It is this feature which permits the use of primary cells as the power supply 26, thereby achieving a considerable cost saving as well as permitting the circuit 10 to be used for long periods in remote and isolated locations having no mains electricity supply.

A further advantageous feature of the circuit 10 is that all the signal levels in the analogue portions of the circuit are ratiometric to the voltage of the switchable negative rail 42b, so that quite significant changes in this voltage do not significantly affect the frequency of the pulses produced at the collector of the transistor TR1.

Figure 2:
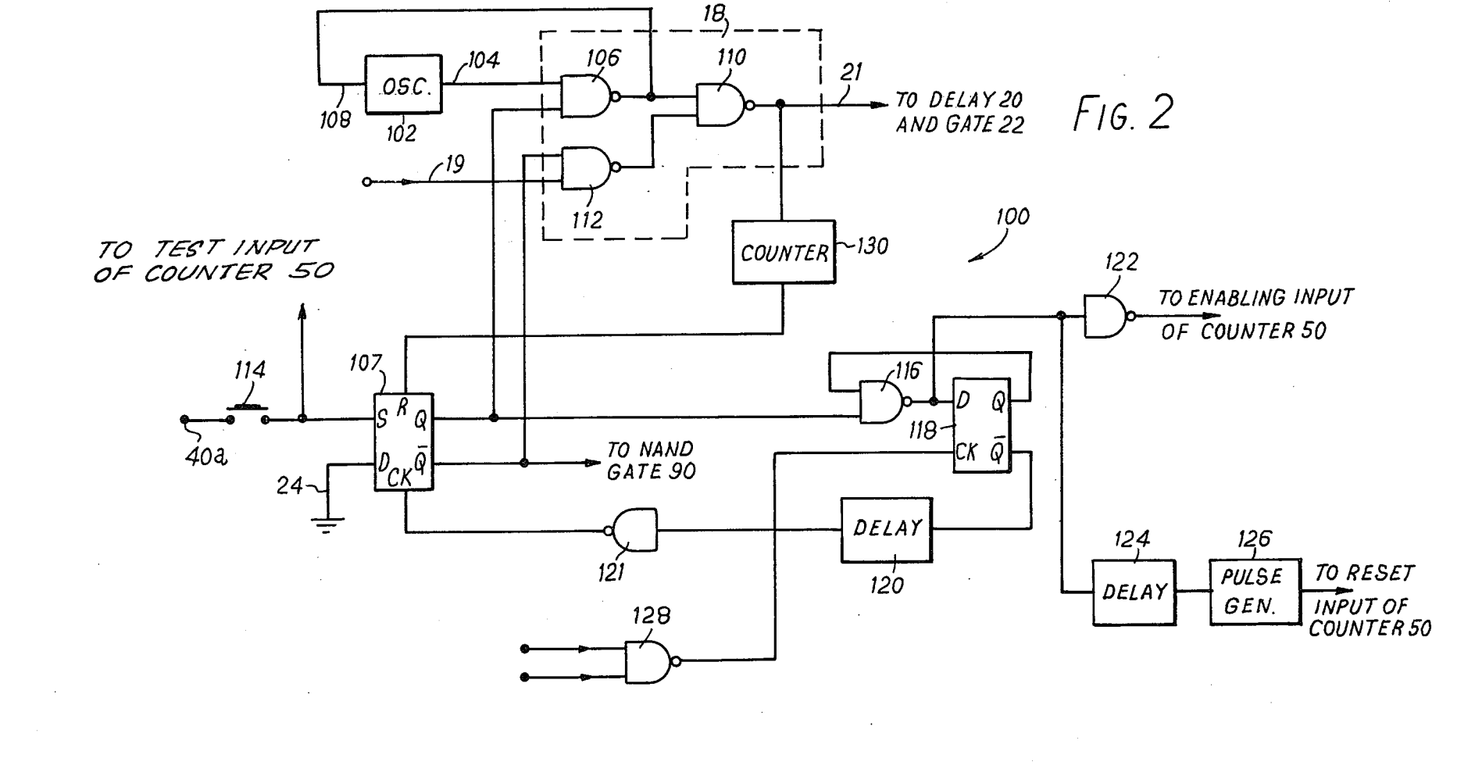
FIG. 2 shows in more detail a part of the circuit of FIG. 1, together with a test control circuit associated with the circuit of FIG. 1.

FIG. 2 shows at 100 a test control circuit forming part of the circuit 10 in FIG. 1. The circuit 100 comprises a test oscillator 102 having a typical operating frequency of 8Hz, whose output 104 is connected to one input of a two-input NAND gate 106. The other input of the NAND gate 106 is connected to the Q output of a test latch bistable circuit 107, while its output is connected to an enabling input 108 of the oscillator 102 and to one input of a two input NAND gate 110. The other input of the NAND gate 110 is connected to the output of the two-input NAND gate 112, one of whose inputs is connected to the $\overline{Q}$ output of the bistable circuit 107. The gates 106, 110, 112 together constitute the switching circuit 18 of FIG. 1, the other input of the NAND gate 112 constituting the input 19 and the output of the NAND gate 110 constituting the output 21. It will be appreciated that when the bistable circuit 107 is in its normal reset state, the NAND gates 106, 112 are disabled and enabled respectively, thus establishing a non-inverting signal path between the input 19 and output 21 of the switching circuit 18.

The set input of the bistable circuit 107 is connected via a manually operable push button 114 to the continuously energised positive supply rail 40a of FIG. 1, so that when a test sequence is initiated by operation of the push-button 114, the bistable circuit 107 is set and thus enables the NAND gate 106 and oscillator 102 and disables the NAND gate 112. The 8Hz pulses produced by the oscillator 102 are therefore applied to the delay circuit 20 and NAND gate 22 of FIG. 1 in place of the pulses produced by the transmitter 14 of the flowmeter.

The Q output of the bistable circuit 107 is also connected to one input of a two-input NAND gate 116, whose output is connected to the D-input of a D-type bistable circuit 118. The Q output of the bistable circuit 118 is arranged to produce a logic level H1 signal prior to the initiation of the test sequence, and is connected to the other input of the NAND gate 116. The $\overline{Q}$ output of the bistable circuit 118 is connected, via a simple RC delay circuit 120 having a typical delay of about 5 seconds and a logic inverter 121, to the clock input of the bistable circuit 107. The bistable circuit 107 is of the D-type, and its D input is connected to the zero volt supply rail 24.

The output of the NAND gate 116 is connected via a logic inverter 122 to an enabling input (not shown) of the counter 50 of FIG. 1, the arrangement being such that the counter 50 is enabled to count only when the NAND gate 116 produces a logic H1 output signal. The output of the NAND gate 116 is also connected, via a delay circuit 124 having a typical delay of a few nanoseconds, to the trigger input of a reset pulse generator 120, whose output is connected to a reset input (not shown) of the counter 50 of FIG. 1. Thus when the bistable circuit 107 is set at the start of a test sequence, the counter 50 is immediately prevented from counting by the NAND gate 116, and the count therein is immediately thereafter reset to zero by the reset pulse generator 126.

The $\overline{Q}$ output of the bistable circuit 107 is connected to a second input of the NAND gate 90 of FIG. 1, which NAND gate operates as inverting OR gate for logic LO signals, while the set input of the bistable circuit 107 is connected to a test input (not shown) of the counter 50 FIG. 1. When the bistable circuit 107 is set at the start of a test sequence, the display unit 86 of FIG. 1 is energised, and as long as the push-button 114 is operated, the count outputs of the counter 50 are set to produce respective signals all corresponding to the digit eight (this setting of the count outputs of the counter 50 is independent of the actual count accumulated in the counter 50 and is not affected by and does not affect the resetting of the counter 50 as described in the preceding paragraph). The display unit therefore displays a reading of six eights, thus permitting the satisfactory operation of all seven segments of each digit of the display unit to be checked.

The clock input of the bistable circuit 118 is connected to the output of a two-input NAND gate 128, whose inputs are respectively connected to the respective $\overline{Q}$ outputs of the bistable circuits 76, 79 of FIG. 1. The output signal produced by the NAND gate 128 therefore changes from a LO level to a HI level whenever either the bistable circuit 76 operates to disable the NAND gate 44 of FIG. 1 or the bistable circuit 79 operates to enable the AND gate 46 of FIG. 1, i.e. each time the circuit 10 operates to block a pulse coming from the switching circuit 18 or to add an auxiliary pulse to the pulses coming from the switching circuit 18.

The first adding or blocking operation to occur in the circuit 10 after the initiation of the test sequence is therefore operative via the NAND gate 128 to change the state of the bistable circuit 118, thus re-enabling the counter 50 via the NAND gate 116 and inverter 122.

The counter 50 commences counting the pulses applied to its count input (which pulses originate from the test oscillator 102), until the next successive adding or blocking operation to occur in the circuit 10 restores the bistable circuit 118 to its original state and again disables the counter 50. The count in the counter 50 at this point is displayed by the display unit 86, and is representative of the interval between successive blocking or successive adding operations performed by the circuit 10. This count is therefore also representative of the magnitude of the difference between the temperature to which the resistance thermometer $R_T$ of FIG. 1 is exposed and the reference temperature.

If a third successive adding or blocking operation does not occur in the circuit 10 within 5 seconds of the restoration of the bistable circuit 118 to its original state, the bistable circuit 107 is reset via the delay circuit 120 and inverter 121, thus terminating the test sequence. However, if the interval between successive adding or blocking operations is less than 5 seconds (i.e. the count in the counter 50 is less than 40), the third successive adding or blocking operation is operative via the NAND gate 128 to again change the state of the bistable circuit 118, thus causing the counting portion of the test sequence to be repeated. In this case the bistable circuit 107 is reset by a counter 130, which has a typical full house count of 512. The count input of the counter 130 is connected to the output of the NAND gate 110, and its overflow output is connected to the reset input of the bistable circuit 107, so that resetting of the bistable circuit 107 occurs about a minute after the start of the test sequence. It will be appreciated that the counter 50 will in this case provide a succession of counts, all less than 40, during the test sequence, which counts can then be averaged to improve resolution.

Thus the test sequence provides a count, or a succession of counts which are then averaged, representative of the temperature difference between the resistance thermometer $R_T$ and the reference temperature. To determine the polarity of this temperature difference, two light-emitting diodes (not shown), preferably one red and the other green, are provided. The respective cathodes of these diodes are commoned with those of the diodes in the display unit 86, and they are respectively connected to be energised by signals derived from the respective outputs of the amplifier 72 and NAND gate 71 of FIG. 1.

It is a simple matter to provide a calibration table listing the respective counts corresponding to various positive and negative values of the temperature difference, illustratively at intervals of 1° Centigrade, when the circuit 10 is operating correctly. The satisfactory operation of the circuit 10 can then be rechecked at regular intervals, such as each time the volume of gas supplied is read from the counter 50, merely by measuring the actual temperature to which the temperature sensitive resistor $R_T$ is exposed with a thermometer, pressing the push-button 114, and checking the count resulting from the test sequence against the calibration table. It will be appreciated that during the test sequence, substantially the whole of the circuit 10 is fully operative, and is therefore checked.

The provision within the circuit 10 of a complete, built-in, self test facility is particularly advantageous, since it permits the circuit to comply with BASEEFA safety requirements for use in Div O locations: if the test facility were not built-in, then the safety certification of the circuit would be invalidated if electrical test equipment were connected to it in situ.

It will be appreciated that many modifications can be made to the described embodiment of the circuit 10. In particular, the NAND gates of the circuit 10 can be replaced by AND gates and OR gates operating entirely with either positive or negative logic level signals. In this context, it should be noted that the expressions "AND-function gate" and "OR-function gates" as used herein include any gating or switching circuits capable of performing AND and OR functions respectively on a plurality of input signals having a common logic level. Further the current-controlled oscillator based on the amplifiers 60, 62 and the transistors TR1, TR2 can obviously be modified if desired to employ PNP transistors in place of the transistors TR1, TR2, or can be replaced by a voltage-controlled oscillator.

If desired, the display unit 86 can be replaced by a display unit of the seven-segment liquid crystal type, or alternatively, the counter 50, driver amplifiers 84 and display unit 86 can be replaced by an electromechanical counter. Further, instead of utilising the counter 50 during the test sequence, a separate counter can be provided, multiplexed if desired with the driver amplifiers 84 and display unit 86. Also, the count accumulated in the counter 50 can be preserved during the changing of the primary cells constituting the power supply 26 by providing standby cells, e.g. mercury cells, connected to the rails 40, 42 via diodes such that they come into operation only when the main primary cells are removed: the working life of such standby cells under these conditions would be substantially equal to their shelf life.

The circuit 10 can also be modified to accept pulse train inputs other than that specifically described in relation to the low frequency emitter 14. For example, it can be modified to accept voltage pulses produced by the combination of a toothed magnetic disc and a coil positioned adjacent the disc so that its inductance is periodically varied by the rotation of the disc, or by the combination of a toothed disc, and an LED and a photocell arranged so that rotation of the disc periodically interrupts a beam of light passing between the LED and the photocell. It will be appreciated that both of these combinations, annd the low frequency transmitter 14, can be relatively easily retro-fitted to most flowmeters of the type defined. If the flowmeter has a transmitter which produces pulses at a much higher frequency than the low frequency transmitter 14, the circuit 10 can include a frequency divider arranged to frequency divide the pulse before their application to the remainder of the circuit. Finally, the circuit 10 can be adapted to correct the flowmeter output signal in dependence upon a parameter of the gas other than its temperature, for example its pressure.

What is claimed is:

1. A correction circuit for correcting the output signal produced by a fluid flowmeter which produces an electrical pulse output signal at a pulse repetition rate which is representative of the volumetric flow rate of the fluid whose flow rate is being measured by the flowmeter, said correction being effected in dependence upon at least one parameter of said fluid, the circuit comprising:

a first input for receiving the output signal produced by the flowmeter, a second input for receiving an input signal representative of the magnitude of said parameter, first circuit means responsive to the flowmeter output signal at the first input to generate a first pulse train at a first average pulse repetition rate which is dependent upon said pulse repetition rate of the flowmeter output signal, a difference circuit responsive to the input signal at the second input to generate an auxiliary signal whose magnitude is dependent upon the difference between the magnitude of said parameter and a reference magnitude of said parameter, means responsive to said first average pulse repetition rate and to the magnitude of the auxiliary signal to increase the number of pulses in the first pulse train by adding auxiliary pulses thereto at a rate dependent upon the magnitude of said difference when said difference is of one polarity, and to decrease the number of pulses in the first pulse train by blocking a fraction thereof at a rate dependent upon the magnitude of said difference when said difference is of the other polarity, whereby the pulse adding and blocking means produces an output pulse train at a second average pulse repetition rate which is representative of the volumetric flow rate of the fluid corrected for variations in said parameter, an oscillator for producing test pulses of predetermined frequency, switch means for applying the test pulses to the first circuit means in place of the flowmeter output signal, and counter means arranged to count the number of pulses produced by the pulse adding and blocking means during an internal defined between a selected one of two successive adding operations and two succesive blocking operations of the pulse adding and blocking means, whereby the count in said counter means at the end of said interval is indicative of the magnitude of said difference.

2. A correction circuit as claimed in claim 1, wherein said predetermined frequency is higher than the highest anticipated pulse repetition rate of the flowmeter output signal.

3. A correction circuit as claimed in claim 1, including
generating means responsive to the auxiliary signal from said difference circuit to generate an oscillatory signal having an average frequency dependent upon the magnitude of said difference, and
additional counter means responsive to each pulse of said first pulse train to count cycles of said oscillatory signal occurring within a period of predetermined duration initiated by that pulse and arranged to produce an overflow signal each time it reaches a predetermined full-house count, wherein said interval is defined between two successive overflow signals.

4. A correction circuit for correcting the output signal produced by a fluid flowmeter which produces an electrical pulse output signal whose pulse repetition rate is representative of the volumetric flow rate of the fluid whose flow rate is being measured by the flowmeter, said correction being effected in dependence upon at least one parameter of said fluid, the circuit comprising:
a first input for receiving the output signal produced by the flowmeter,
a second input for receiving an input signal representative of the magitude of said parameter,
first circuit means responsive to the flowmeter output signal at the first input to generate a first pulse train whose average pulse repetition rate is dependent upon the pulse repetition rate of the flowmeter output signal,
means responsive to the input signal at the second input to modify the pulse repetition rate of the first pulse train in dependence upon the magnitude of said parameter so as to produce an output pulse train whose average pulse repetition rate is representative of the volumetric flow rate of the fluid corrected for variations in said parameter,
a power supply which, in operation, is continuously connected to energise a first portion of the circuit, said first portion being arranged to consume a relatively small proportion of the power required by the circuit, and
switching means connected to the power supply and responsive to each pulse of the flowmeter output signal to energise the remainder of the circuit for a relatively short period, whereby to reduce the total power required by the circuit.

5. A correction circuit as claimed in claim 4, wherein the first portion of the circuit includes the first circuit means.

6. A correction circuit as claimed in claim 5, wherein the first circuit means comprises a delay arranged to delay the flowmeter output pulses for a relatively short period, and first pulse producing means responsive to the leading edge of each delayed flowmeter output pulse to produce a corresponding pulse of relatively short duration, the output pulses produced by said first pulse producing means constituting the first pulse train, and the switching means is arranged to energise the remainder of the circuit between the leading edge of each flowmeter pulse and the trailing edge of the corresponding pulse produced by the first pulse producing means.

7. A correction circuit as claimed in claim 6, wherein the first pulse producing means comprises a first monostable circuit, and the second circuit means comprises a second monostable circuit connected to be triggered by the trailing edge of each delayed flowmeter output pulse.

8. A correction circuit for correcting the output signal produced by a fluid flowmeter which produces an electrical pulse output signal whose pulse repetition rate is representative of the volumetric flow rate of the fluid whose flow rate is being measured by the flowmeter, said correction being effected in dependence upon at least one parameter of said fluid, the circuit comprising:
a first input for receiving the output signal produced by the flowmeter,
a second input for receiving an input signal representative of the magnitude of said parameter,
first circuit means responsive to the flowmeter output signal at the first input to generate a first pulse train whose average pulse repetition rate is dependent on the pulse repetition rate of the flowmeter output signal,
second circuit means responsive to the input signal at the second input to generate a second pulse train whose average pulse repetition rate is dependent on the magnitude of said parameter,
means for combining said first and second pulse trains so as to produce an output pulse train whose average pulse repetitive rate is representative of the volumetric flow rate of the fluid corrected for variations in said parameter, a power supply which, in operation, is continuously connected to energize a first portion of the circuit, said first portion being arranged to consume a relatively small proportion of the power required by the circuit, and switching means connected to the power supply and responsive to each pulse of the flowmeter output signal to energize the remainder of the circuit for a relatively short period, whereby to reduce to total power required by the circuit.

* * * * *